(12) United States Patent
Yang

(10) Patent No.: US 6,899,236 B2
(45) Date of Patent: May 31, 2005

(54) COMBINED RACK AND CONTAINERS

(76) Inventor: Heng-Te Yang, P.O. Box 90, Tainan City (TW)

(*) Notice: Subject to any disclaimer, the term of this patent is extended or adjusted under 35 U.S.C. 154(b) by 0 days.

(21) Appl. No.: 10/630,678

(22) Filed: Jul. 31, 2003

(65) Prior Publication Data
US 2005/0023233 A1 Feb. 3, 2005

(51) Int. Cl.[7] ................................................ A47F 7/00
(52) U.S. Cl. ................... 211/71.01; 211/75; 248/206.4; 248/310; 248/311.3
(58) Field of Search ............................... 211/71.01, 72, 211/73, 74, 75; 248/311.3, 310, 206.3, 206.4

(56) References Cited

U.S. PATENT DOCUMENTS

| | | | | |
|---|---|---|---|---|
| 776,332 A | * | 11/1904 | Kloeppinger | 211/75 |
| 1,093,033 A | * | 4/1914 | Canby | 211/73 |
| 1,663,822 A | * | 3/1928 | Walker | 215/376 |
| 1,739,801 A | * | 12/1929 | Pitts | 220/483 |
| 1,876,264 A | * | 9/1932 | Tucker | 108/25 |
| 2,463,664 A | * | 3/1949 | Watson | 248/149 |
| 2,508,945 A | * | 5/1950 | Heuer | 211/75 |
| 2,957,585 A | * | 10/1960 | Berlener | 211/74 |
| 4,378,889 A | * | 4/1983 | Lebowitz | 211/75 |
| D297,862 S | * | 9/1988 | Dryden | D6/515 |
| D322,343 S | * | 12/1991 | Pearcy | D32/58 |
| D346,312 S | * | 4/1994 | Spiersch | D7/708 |
| D406,715 S | * | 3/1999 | Badillo | D6/567 |

* cited by examiner

*Primary Examiner*—Robert W. Gibson, Jr.

(57) ABSTRACT

A combined rack and containers in the invention has an L-shaped rack provided with a plurality of engagement mounts disposed thereon, a plurality of mounting keyholes disposed in a rear wall thereof, and a plurality of recessed holes disposed adjacent four corners of an outside surface of a bottom thereof, each of the recessed holes provided with a non-slipping member securely fixed therein; a plurality of containers capable of being supported on the rack and each provided with an engagement recess disposed in a bottom thereof, by which the plurality of containers can be securely held on the rack in place by making the engagement recesses of the containers respectively engaged with the engagement mounts of the rack.

1 Claim, 3 Drawing Sheets

COMBINED RACK AND CONTAINERS

BACKGROUND OF THE INVENTION

1. Field of the Invention

This invention relates to a combined rack and containers, particularly to one having an L-shaped rack provided with a plurality of engagement mounts disposed thereon, a plurality of mounting keyholes disposed in a rear wall thereof, and a plurality of recessed holes disposed adjacent four corners of an outside surface of a bottom thereof, each of the recessed holes provided with a non-slipping member securely fixed therein; a plurality of containers capable of being supported on the rack and each provided with an engagement recess disposed in a bottom thereof, by which the plurality of containers can be securely held on the rack in place by making the engagement recesses of the containers respectively engaged with the engagement mounts of the rack.

2. Description of the Prior Art

Generally speaking, there are many containers for seasoning, beauty products, etc. in the house and most of them are placed on the table tops or cabinets. However, they are often placed in bad order and occupied too much space, which greatly increases difficulty in taking them for use because they are liable to be fallen down under collision with other containers and significantly affects the overall aesthetic appearance of the arrangement in the house.

SUMMARY OF THE INVENTION

The main purpose of the invention is to offer a combined rack and containers that is convenient for securely holding the containers on the rack in place and occupied with little space.

The main feature of the invention is to provide a combined rack and containers, mainly including:

a rack being in an L-shaped form and having a plurality of engagement mounts disposed thereon; and, a plurality of containers capable of being supported on said rack and each provided with an engagement recess disposed in a bottom thereof.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
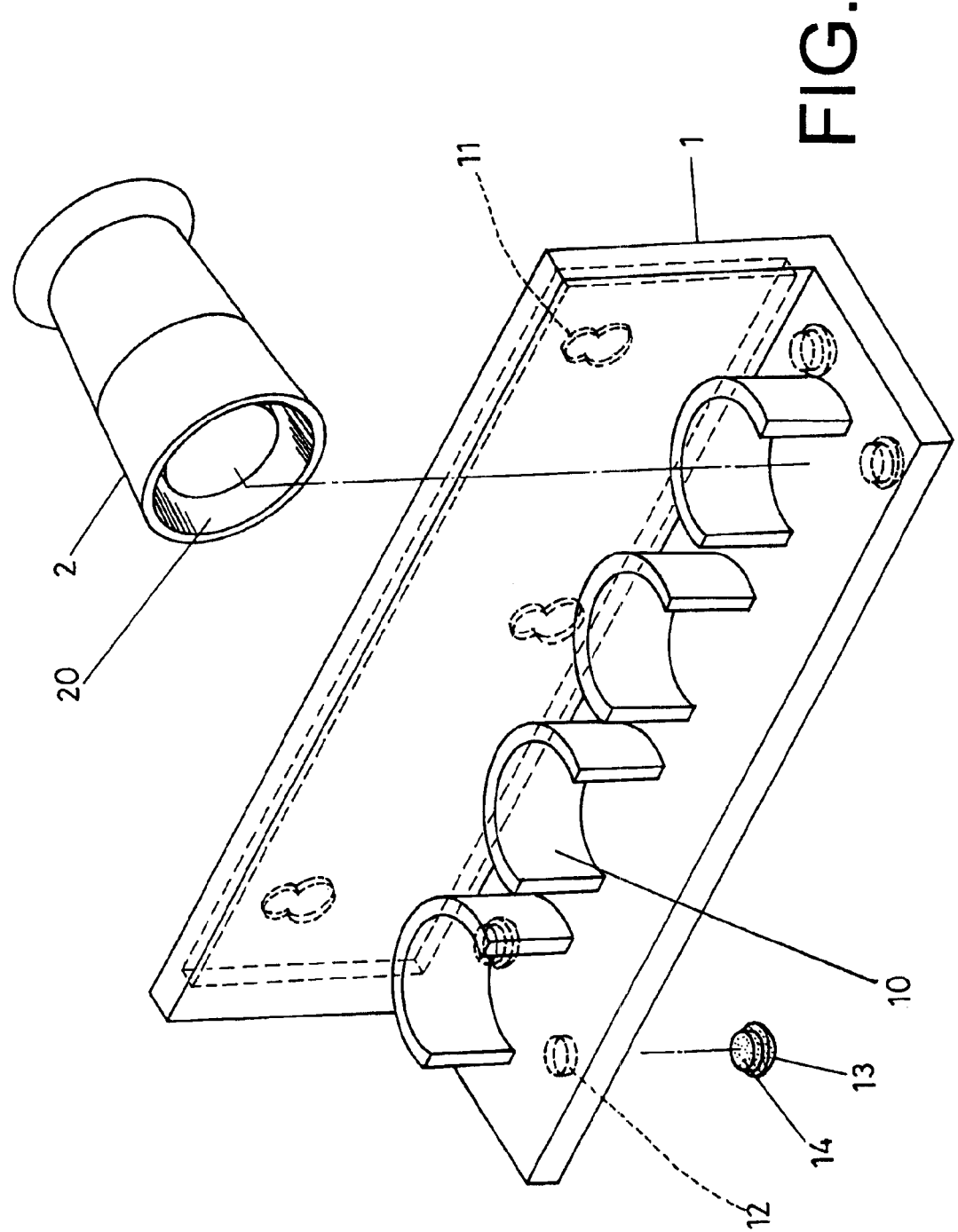
FIG. 1 is an exploded perspective view of a combined rack and containers in the present invention.

A preferred embodiment of a combined rack and containers in the present invention, as shown in FIG. 1, mainly includes a rack 1 and a plurality of containers 2.

The rack 1 in an L-shaped form has a plurality of engagement mounts 10 disposed thereon and designed to be an approximately semicircular form, a plurality of mounting keyholes 11 disposed in a rear wall thereof, and a plurality of recessed holes 12 disposed adjacent four corners of an outside surface of a bottom thereof. Each of the recessed holes 12 is inserted with a non-slipping member 13 securely therein. Each of the non-slipping members 13 is provided with a projection 14 disposed at a top thereof.

The plurality of containers 2 are capable of being supported on the rack 1 and each provided with an annular engagement recess 20 disposed in a bottom thereof.

Figure 2:
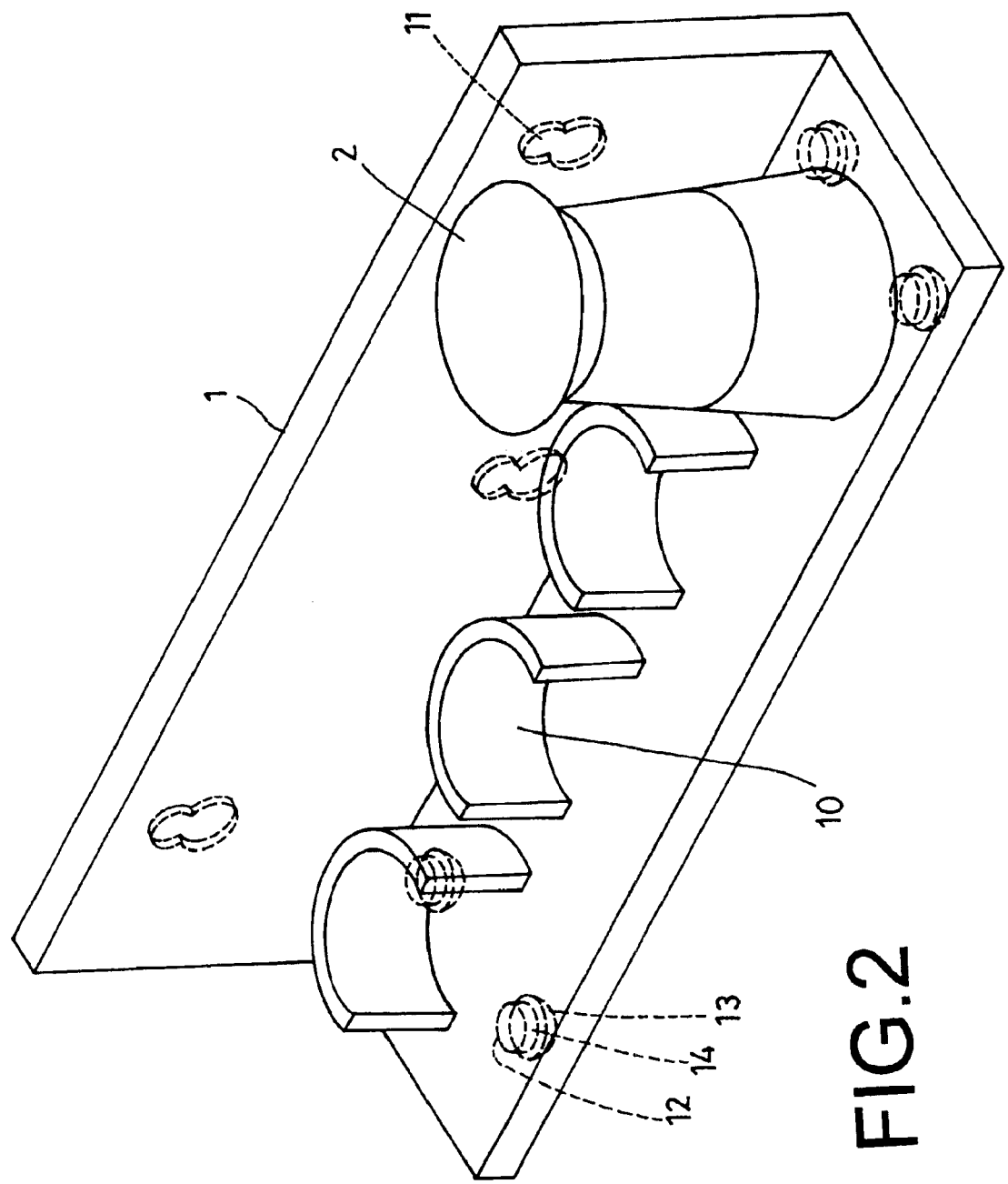
FIG. 2 is a perspective view of the combined rack and containers in the present invention.
Figure 3:
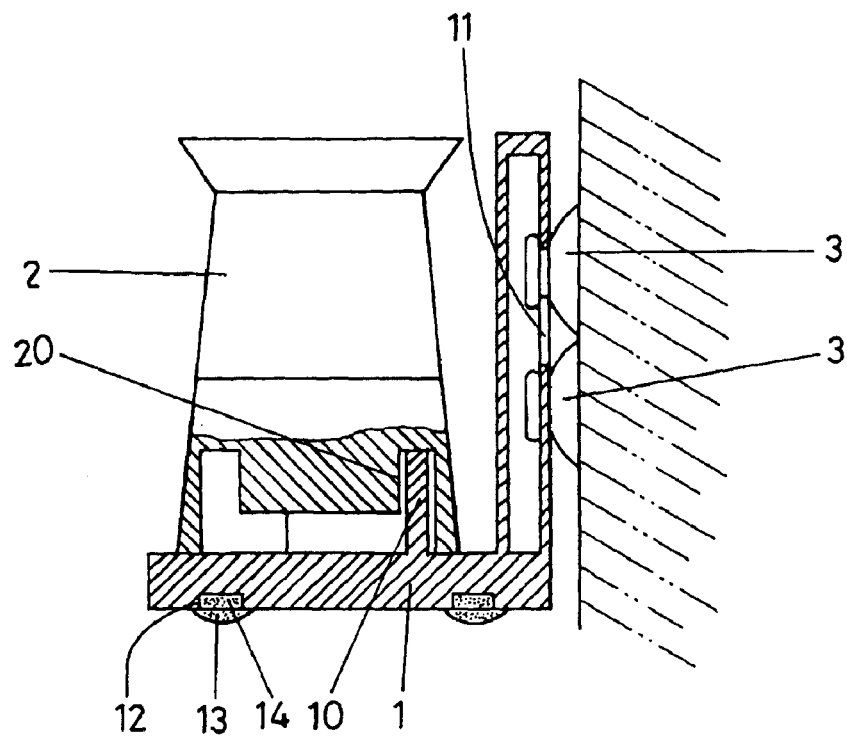
FIG. 3 is a schematic view of the combined rack and containers in the present invention being attached to a wall by means of suction cups; and, FIG. 4 is a schematic view of the combined rack and containers in the present invention being attached to a wall by means of fastening members.
Figure 4:
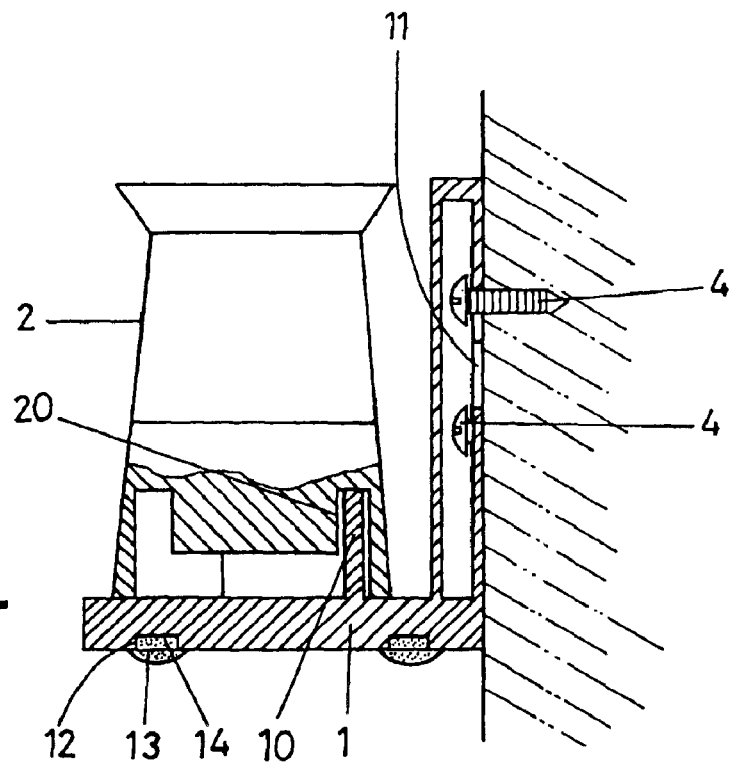

In assembling, referring to FIGS. 2, 3 and 4, firstly add an adhesive material on the projections 14 of the non-slipping members 13 and then insert the projections 14 respectively into the recessed holes 12 of the rack 1. Secondly, place the rack 1 on a table top or a cabinet. At this time, the non-slipping members 13 located under the bottom of the rack 1 can prevent the rack 1 from slipping away. Finally, make the engagement recesses 20 of the plurality of containers 2 respectively engaged with the engagement mounts 10 of the rack 1 so that the containers 2 can be securely held on the rack 1 in place, by which the containers 2, such as varied seasoning canisters used in the kitchen, can be arranged in good order, neat and beautiful in appearance, and easy to be taken for use without the danger of being fallen down under collision with other containers.

Moreover, as shown in FIG. 3, suction cups 3 are capable of being connected with the mounting keyholes 11 of the rear wall of the rack 1 for attaching to smooth surfaces, such as glass, outer wall surfaces of refrigerators, etc., so that the rack 1 may be securely fastened to such smooth surfaces. And then, make the engagement recesses 20 of the plurality of containers 2 respectively engaged with the engagement mounts 10 of the rack 1 so that the containers 2 can be securely held on the rack 1 in place without the danger of being fallen down.

Furthermore, as shown in FIG. 4, fastening members 4 are capable of being directly nailed into a wall for extending through the mounting keyholes 11 of the rack 1 to make the rack 1 securely fastened to the wall, by which the containers 2 can also be securely held on the rack 1 in place, easy to be arranged, convenient to be taken for use and only occupied little space.

The invention has the following advantages, as can be understood from the aforesaid description.

1. The combined rack and containers in the present invention is very simple in assembling.

2. The containers 2 in the present invention are easy to be arranged in good order and securely held on the rack 1, capable of saving storage space and convenient to be taken for use.

3. The combined rack and containers in the present invention may be placed on a table top or fastened to a wall or any smooth surfaces, very convenient in use.

While the preferred embodiment of the invention has been described above, it will be recognized and understood that various modifications may be made therein and the appended claims are intended to cover all such modifications that may fall within the spirit and scope of the invention.

What is claimed is:

1. A combined rack and containers comprising:

a rack being in an L-shaped form and having a plurality of engagement mounts disposed thereon;

a plurality of containers capable of being supported on said rack and each provided with an engagement recess disposed in a bottom thereof; and, whereby said plurality, of containers can be securely held in place on said rack by making said engagement recesses of said containers respectively engaged with said engagement mounts of said rack;

wherein said rack is provided, with a plurality of mounting keyholes disposed in a rear wall thereof so that said rack may be conveniently fastened to a wall;

wherein said rack is provided with a plurality of recessed holes disposed in an outside surface of a bottom thereof and each of said recessed holes is inserted with a non-slipping member securely therein so that said rack may be conveniently placed on a table top without slipping away;

wherein said plurality of engagement mounts of said rack are designed to be in an approximately semicircular form;

a plurality of suction cups, wherein said suction cups are capable of being connected with said mounting keyholes of said rear wall of said rack for attaching to smooth surfaces so that said rack may be conveniently fastened to smooth surfaces.

* * * * *